(No Model.)
G. C. FITTS.
CHAMBER VESSEL.
No. 501,601. Patented July 18, 1893.
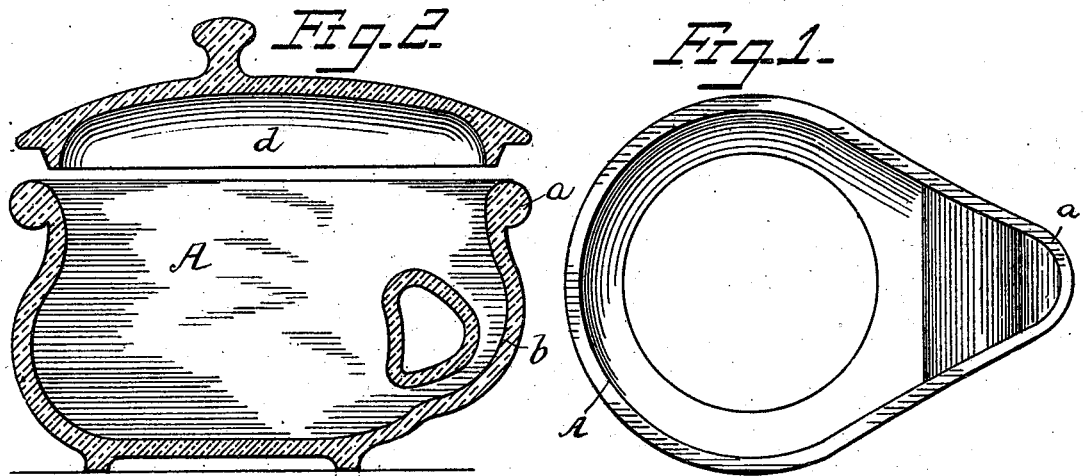
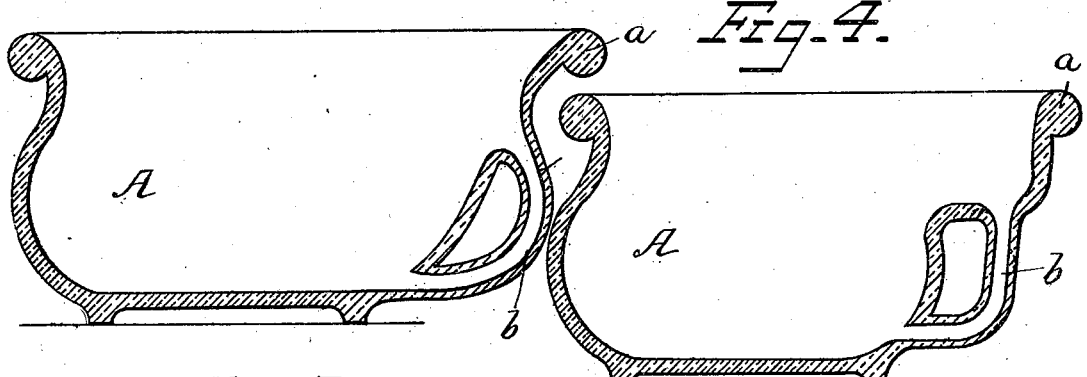
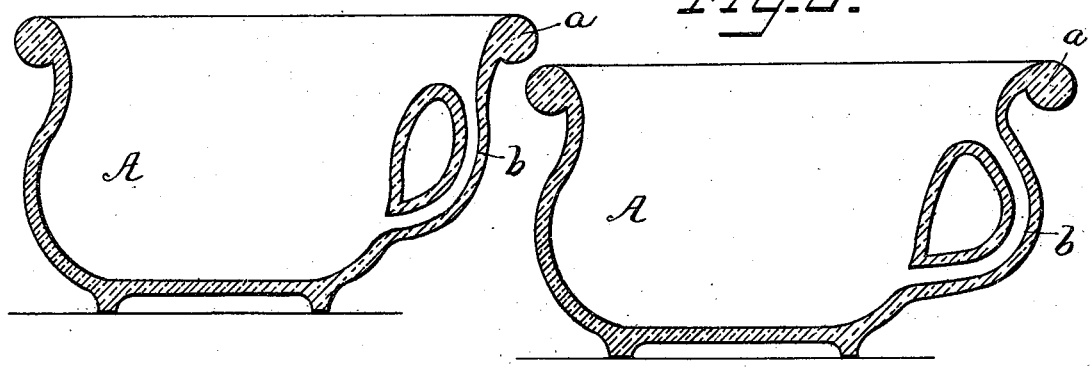
Witnesses
Albert Popkins.
Jas. L. Skidmore.
Inventor
George C. Fitts,
by Haven & Hovey
his Attorneys.

United States Patent Office.

GEORGE C. FITTS, OF DURHAM, NORTH CAROLINA.

CHAMBER-VESSEL.

SPECIFICATION forming part of Letters Patent No. 501,601, dated July 18, 1893.

Application filed August 1, 1892. Serial No. 441,815. (No model.)

*To all whom it may concern:*

Be it known that I, GEORGE C. FITTS, a citizen of the United States, residing in the city of Durham, Durham county, State of North Carolina, have invented certain new and useful Improvements in Chamber-Vessels, of which the following is a specification.

The object of my invention is to construct a simple and economical chamber vessel for the use of both sexes, but more especially adapted for the convenience and comfort of the male, and my invention consists in providing the vessel with an extension at or near the top, and a hollow handle or equivalent portion for the purpose hereinafter explained, reference being had to the accompanying drawings, in which—

Figure 1, illustrates a plan view of my improved vessel. Fig. 2 is a central vertical section of the same, and Figs. 3, 4, 5 and 6 are modifications of my invention.

A represents the body portion of my improved chamber vessel, $a$ the narrowed or lip-shaped extension of the vessel, $b$ the hollow handle communicating at one end with the portion $a$ and at the other end with the extension $b$ and $d$ the top or cover adapted to fit tightly upon the vessel when not in use.

It will be readily observed that by constructing the vessel with the narrowed extension, as shown, it renders said vessel especially comfortable and convenient for the male sex, when in use, yet, at the same time it is equally adapted for the use of the other sex.

For the convenience and comfort of the male, I have provided the vessel with a hollow handle communicating at one end with the narrowed extension $a$ and at the other end with the lower portion of the vessel, so that the urine will pass from the upper portion or extension, through the hollow handle $b$ and into the body or lower portion of said vessel, thus serving the double purpose namely:—as a handle to manipulate the vessel and a conduit for conveying the urine to the lower portion of the vessel.

While I have shown a hollow handle serving as a conduit for the urine, I do not desire to limit myself to said hollow handle, nor to the location of same, as shown, as it may differ in both shape and location without departing from my invention.

The lid of the vessel is so constructed as to fully conform with the shape or contour of the top or upper portion of said vessel, so that in all cases it will fit snugly in order to prevent objectionable odors from emanating into the room.

While I prefer the form of vessel with narrowed extension, as illustrated in Figs. 1 and 2, yet said vessel with the extension might be made in any desired shape, without departing from the spirit of my invention, as shown by the modifications Figs. 3, 4, 5 and 6. It is obvious, of course, that my invention can be utilized in connection with or without a seat, which at the same time forms a receptacle for the vessel.

I claim as my invention—

1. A chamber or other vessel provided with a hollow handle communicating with both the upper and lower portion of said vessel, substantially as and for the purpose described.

2. A chamber vessel, having a narrowed extension and a hollow handle communicating with said extension, substantially as, and for the purpose set forth.

3. A chamber vessel having an extension and a hollow handle forming a conduit between said extension and the body of the vessel, substantially as and for the purpose described.

In testimony whereof I have signed my name to this specification in the presence of two subscribing witnesses.

GEORGE C. FITTS.

Witnesses:
T. B. FULLER,
J. SCHWARTZ.